United States Patent [19]

Disselkötter

[11] 3,725,402

[45] Apr. 3, 1973

[54] 3-SUBSTITUTED-6-CHLORO-2H-1,3-OXAZINE-2,4(3H)-DIONE

[75] Inventor: Hans Disselkötter, Cologne, Germany

[73] Assignee: Farbenfabriken Bayer Aktiengesellschaft, Leverkusen, Germany

[22] Filed: July 13, 1970

[21] Appl. No.: 54,660

[30] Foreign Application Priority Data

Aug. 8, 1969  Germany.....................P 19 40 368.0

[52] U.S. Cl.............................260/244 R, 424/248
[51] Int. Cl.............................................C07d 87/14
[58] Field of Search...................................260/244 R

[56] References Cited

OTHER PUBLICATIONS

Ziegler et al. I Chem. Abst. Vol. 59, columns 10044 – 10045 (1963), QD1.A51.
Ziegler et al. II Monatsh. Chem. Vol. 94, pages 544–548 (1963), QD1.M73
Ziegler et al. III. Chem. Abst. Vol. 64, columns 17584–17505 (1966), QD1.A51.
Ziegler et al. IV Monatsh. Chem. Vol. 97, pages 10–18 (1966), QD1.M73
Chemical Abstracts Seventh Collective Index Subjects Ni–PHe - PHe Volumes 56–65, 1962–1966 page 16,067 S (1970), QD1.A51
Lacey et al. J. Chem. Soc. (London) 1958, pages 2134–2141. QD1.C6
Gunar et al. Chem. Abst. Vol. 67, No. 54097p (1967), QD1.A51 0

Primary Examiner—Natalie Trousof
Attorney—Burgess, Dinklage & Sprung

[57] ABSTRACT

3-substituted-6-chloro-2H-1,3 oxazine-2,4(3H)-dione are obtained by reacting malonic acid dichloride with an isocyanate in the presence of a catalyst at a temperature of from $-70°$ to $-50°C$, and removing the hydrogen chloride formed, by heating after the exothermic reaction has abated.

The compounds for instance 6-chloro-3-methyl-2H-1,3-oxazine-2-4(3H)-dione may be used in the production of plant-protection agents or even directly as such for controlling insects and mites.

5 Claims, No Drawings

3-SUBSTITUTED-6-CHLORO-2H-1,3-OXAZINE-2,4(3H)-DIONE

This invention relates to novel 3-substituted-6-chloro-dihydro-1,3-oxazin-2,4-diones and to a process for their preparation. These compounds are also called 3-substituted-6-chloro-2H-1,3-oxazine-2,4(3H)-diones.

It is known that malonic acid dichloride reacts when heated with isocyanates in a ratio of 2:1 to form bicyclic compounds, 3 mols of hydrogen chloride being drive off. The intermediate product of this reaction is a monocyclic condensation product of 2 mols of malonic acid chloride (Journal of the Chemical Society, (London) 1963, 3069).

It has been found that 3-substituted-6-chloro-dihydro-1,3-oxazin-2,4-diones can be obtained by reacting malonic acid dichloride with an isocyanate in the presence of a catalyst at a temperature of from $-70°$ to $+50°C$, and removing the hydrogen chloride formed, by heating after the exothermic reaction has abated.

The isocyanates used for the process are known from Annalen 562, pages 75 – 136 (1969).

The isocyanates preferably used for the process correspond to the general formula R-NCO, in which R represents an optionally substituted aliphatic or cycloaliphatic radical. Aliphatic and cycloaliphatic radicals include alkyl radicals with from 1 to 24, and preferably from one to 12, carbon atoms; alkenyl radicals with from 2 to 18, and preferably with from two to six, carbon atoms; and cycloalkyl radicals with preferably five or six carbon atoms in the ring system. Suitable substituents for the aliphatic radical include halogens (preferably fluorine, chlorine or bromine), alkoxy and carboalkoxy groups (preferably with from one to four carbon atoms).

The new compounds correspond to the general formula:

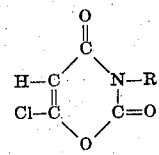

in which R is as defined above.

The process is illustrated with reference to the following example:

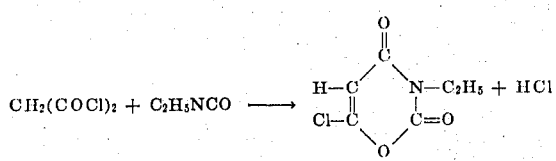

Catalysts suitable for the purposes of the invention include halides of the elements of groups I B to V B or IV A (see K.A. Hofmann u. W.R. Hofmann, Anorg. Chem. 12$^{th}$ edition 1948, Vieweg & Sohn, Braunschweig) of the Mendeleev Periodic Table. The following are mentioned as examples: $SnCl_2$, $SnCl_4$, $ZnCl_2$, $ZnBr_2$, $TiCl_4$, $CuCl$, $CuBr$ and $SbCl_5$. It is also possible, however, to use as catalysts other organic compounds of the same elements, or organic salts such as:

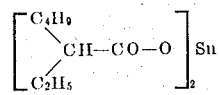

or metal powders, for example zinc powder, which are converted, at least partly, into halides in the reaction mixture. The quantity in which the catalysts are used is from about 0.01 to 10 percent and preferably from 0.1 to 5 percent based on total reactants.

Examples of suitable isocyanates include methyl, ethyl, propyl, allyl, butyl, dodecyl, cetyl, 2-chloroethyl, methoxymethyl and cyclohexyl isocyanate.

Suitable solvents optionally include those of the kind which do not react either with malonic acid chloride or with the isocyanate used, for example the usual hydrocarbons, optionally substituted by halogen groups or nitro groups, ethers, esters, nitriles, sulphones, sulphonic acid esters or liquid sulphur dioxide.

In its simplest form, the process can be carried out at ambient pressure and at, or slightly below, room temperature by mixing the reactants and the catalyst and dissipating the heat of reaction. When a readily volatile solvent is used, however, it may be necessary to operate at a relatively low temperature or under pressure.

To carry out the process according to the invention, it has proved to be of advantage to carry out the reaction at a relatively low temperature within the range given above of from $-20°$ to $+20°C$, preferably at $0°C$, and to remove the hydrogen chloride formed by heating at $50°$ to $150°C$ and preferably at $70°$ to $100°C$, after the exothermic reaction has abated.

In order to avoid the formation of bicyclic products, malonic acid chloride should not be used in too large an excess. In general, it is preferred to employ substantially equimolar quantities, although in some instances it has proved to be of advantage to use an excess of isocyanate of up to 50 mol %.

In a preferred embodiment, the isocyanate to be reacted is added dropwise in a molar excess of around 25 percent at about $0°C$ to a solution cooled to around $0°C$ of malonic acid chloride in ethyl acetate, following the addition of a little $SnCl_4$. After the reaction has ended, at a temperature rising gradually from $0°C$ to $25°C$, the reaction mixture is boiled under reflux for 1 to 3 hours.

The reaction product can be worked up by the usual methods, for example it can be distilled, sublimed or recrystallized after the solvent has been distilled off.

The N-substituted-6-chloro-dihydro-1,3-oxazin-2,4-diones obtained are novel compounds which may be used in the production of plant-protection agents or even directly as such for controlling insects and mites.

*Rhopalosiphum* test (systemic effect):
solvent: 3 parts by weight of dimethyl formamide
emulsifier: 1 part by weight of alkyl aryl polyglycol ether.* (*substituted phenol reacted with ethylenoxide.)

To prepare a suitable active ingredient preparation, 1 part by weight of the active ingredient is mixed with the aforementioned quantity of solvent containing the aforementioned quantity of emulsifier, and the resulting concentrate is diluted with water to the required concentration.

Oat plants (*Avena sativa*) seriously affected by the oat louse (*Rhopalosiphum padi*) are watered with the active ingredient preparation so that the preparation penetrates into the soil without wetting the leaves of the oat plants. The active ingredient is absorbed by the plants from the soil, and thus reaches the affected leaves.

The percentage mortality rate is determined after the intervals indicated. 100 percent means that all the lice were killed, 0 percent means that none of the lice were killed.

The active ingredients, their concentrations, the evaluation times and results are set out in the following Table 1:

TABLE 1

(Plant-damaging insects)

| Active Ingredients | Active ingredient concentration in % | Mortality rate in % after |
|---|---|---|
| 6-chloro-3-methyl-dihydro-1,3-oxazin-2,4-dione | 0.2 | 100% 4$^d$ |
| 6-chloro-3-allyl-dihydro-1,3-oxazin-2,4-dione | 0.2 | 95% 4$^d$ |
| 6-chloro3-(2'-chloroethyl)-dihydro-1,3-oxazin-2,4-dione | 0.2 | 100% 4$^d$ |
| 6-chloro-3-butyl-dihydro-1,3-oxazin-2,4-dione | 0.2 | 100% 4$^d$ |

Tetranychus test
solvent: 3 parts by weight of dimethyl formamide
emulsifier: 1 part by weight of alkylaryl polyglycol ether*

To prepare a suitable active ingredient preparation, 1 part by weight of the active ingredient is mixed with the aforementioned quantity of solvent containing the aforementioned quantity of emulsifier and the concentrate is diluted with water to the required concentration.

Bean plants (*Phaseolus vulgaris*) which have grown to a height of approximately 10 to 30 cm, are sprayed with the active ingredient preparation. The bean plants have been seriously affected in all stages of growth by the common spider (*Tetranychus urticae*).
*see page 5

The effectiveness of the active ingredient preparation is determined after the interval specified by counting the dead spiders. The mortality rate obtained is expressed as a percentage. 100 percent means that all the spiders were killed, 0 percent means that none of the spiders were killed.

The active ingredients, active ingredient concentrations, evaluation times and results are set out in the following Table 2:

TABLE 2

(Plant-damaging mites)

| Active Ingredients | Active ingredient concentration in % | Mortality rate in % after |
|---|---|---|
| 3-cyclohexyl-6-chloro-dihydro-1,3-oxazin-2,4-dione | 0.2 | 100% 48$^h$ |

The other new compounds which can be obtained by the process according to the invention also show comparable activity against insects and mites.

EXAMPLE 1

2 ml of SnCl$_4$ followed by 142 g (2.5 mols) of methyl isocyanate were added dropwise at 0°C to a solution of 282 g (2mols) of malonic acid dichloride in 1 liter of ethyl acetate. The temperature of the reaction mixture was allowed to rise to 20° – 25°C within the following 4 hours. After standing for a total of 15 to 20 hours, the reaction mixture was boiled under reflux until no more hydrogen chloride escaped (approximately 3 hours). It was then filtered while still hot, following addition of a little active carbon, and the filtrate was sublimed or distilled after the solvent had been distilled off. 6-Chloro-3-methyl-dihydro-1,3-oxazin-2,4-dione melting at 102 to 104°C:

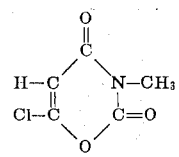

was obtained at 85 to 90°/0.3 Torr in a yield of 225 g or 70 percent.

EXAMPLES 2 TO 6

The following 6-chloro-3-alkyl-dihydro-1,3-oxazin-2,4-diones corresponding to the formula:

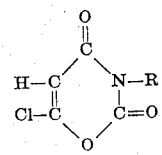

were obtained as in Example 1:

| Example No. | R | Boiling poing | Melting point | Yield | mol Isocyanate per mol malonyl chloride |
|---|---|---|---|---|---|
| 2 | 2-chloro-ethyl | 95°/0.3 Torr | 92° | 45% | 1.0 |
| 3 | allyl | 90°/0.3 Torr | 80° | 70% | 1.25 |
| 4 | n-butyl | 82°/0.2 Torr | 61° | 52% | 1.0 |
| 5 | n-dodecyl |  | 88° | 50% | 1.0 |
| 6 | cyclohexyl |  | 132° | 48% | 1.0 |

The products of Examples 5 and 6 were not distilled but the residue after evaporation of solvent was isolated and recrystallized.

The yields quoted relate to already recrystallized pure substance.

EXAMPLES 7 TO 12

7.2 g of methyl isocyanate were added dropwise to a solution cooled to 0°C of 14.1 g of malonic acid chloride in 50 ml of ethyl acetate, following the addition of a catalyst of the kind specified in the following table. After the reaction mixture had undergone an increase in temperature to 22°C over a period of 3 hours, it was left standing at this temperature for a period of 14 hours, subsequently heated under reflux for 2 hours, and the solvent was subsequently distilled off *in vacuo*.

Following sublimation at 0.2 Torr, the solidified residue gave 6-chloro-3-methyl-dihydro-1,3-oxazin-2,4-dione melting at 102° to 104°C.

| Example | Catalyst | Yield |
|---------|----------|-------|
| 7 | 0.2 ml SnCl$_4$ | 65% |
| 8 | 0.2 g ZnCl$_2$ | 55% |
| 9 | 0.2 ml TiCl$_4$ | 25% |
| 10 | 0.2 ml SbCl$_5$ | 35% |
| 11 | 0.2 g CuCl | 15% |
| 12 | (blank test) | <1% |

What we claim is:

1. Compound corresponding to the formula:

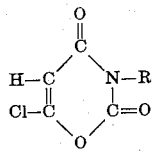

wherein
R is alkyl of 1 to 12 carbon atoms, alkenyl of 2 to 6 carbon atoms, cycloalkyl of 5 to 6 carbon atoms or haloalkyl of 1 to 12 carbon atoms.

2. Compound of claim 1 selected from the group of
6-Chloro-3-methyl-2H-1,3-oxazine-2,4(3H)-dione,
6-Chloro-3-(2'-chloroethyl)-2H-1,3-oxazine-2,4(3H)-dione,
6-Chloro-3-allyl-2H-1,3-oxazine-2,4(3H)-dione,
6-Chloro-3-n-butyl-2H-1,3-oxazine-2,4(3H)-dione,
6-Chloro-3-n-dodecyl-2H-1,3-oxazine-2,4(3H)-dione, and
6-Chloro-3-cyclohexyl-2H-1,3-oxazine-2,4(3H)-dione.

3. Process for preparing a 3-substituted-6-chloro-2H-1,3-oxazine-2,4(3H)-dione which comprises reacting malonic acid dichloride with an isocyanate of the formula R-NCO wherein R is selected from the group consisting of alkyl of one to 12 carbon atoms, alkenyl of two to six carbon atoms, cycloalkyl of five to six carbon atoms, haloalkyl of one to 12 carbon atoms in the presence of from 0.01 to 10 percent, based on the total reactants, of a catalyst selected from the group consisting of the halides of tin, zinc, titanium, copper, or antimony, at a temperature of from −70° to +50°C, and removing the hydrogen chloride formed by heating after the exothermic reaction has abated.

4. Process of claim 3 wherein the reaction is carried out in the presence of an inert solvent.

5. Process of claim 3 wherein the reaction is carried out at a temperature of from −20° to +20°C and the hydrogen chloride formed is removed by heating at 50° to 150°C.

* * * * *